Feb. 12, 1957  H. C. HARBERS ET AL  2,781,186
DRUM CONTROL MEANS FOR TRANSIT CONCRETE MIXERS
Filed Nov. 17, 1952  3 Sheets-Sheet 1
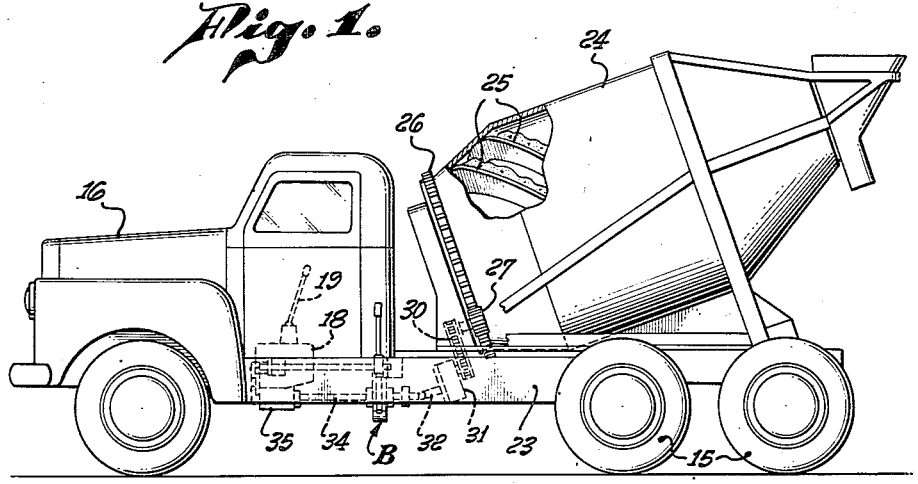
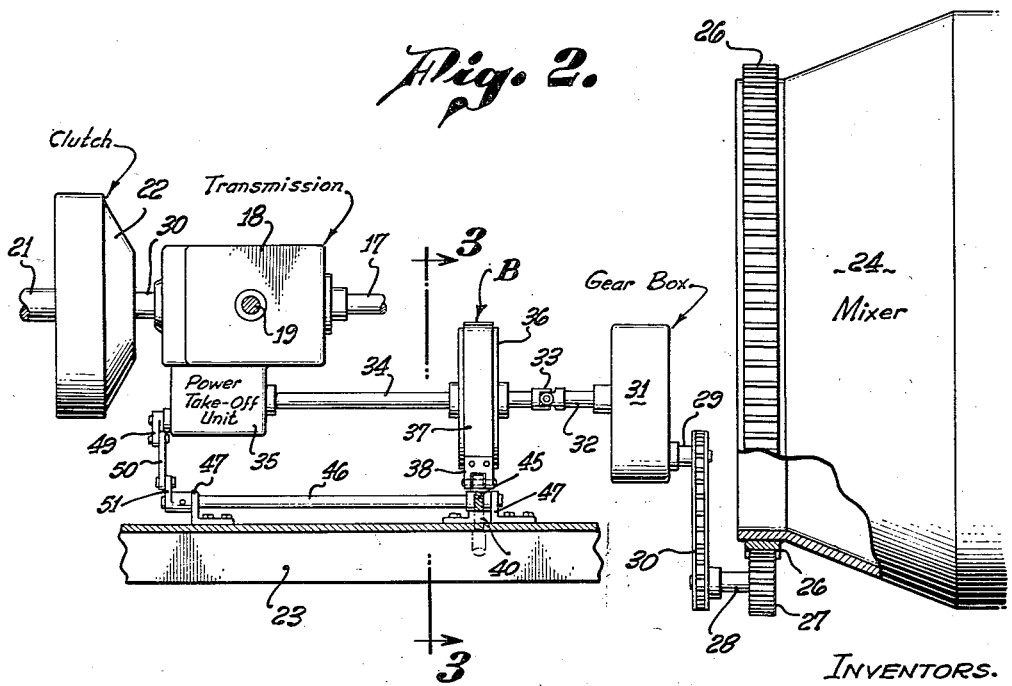
INVENTORS.
HENRY C. HARBERS,
EDWARD D. SHARPE,
BY
ATTORNEY.

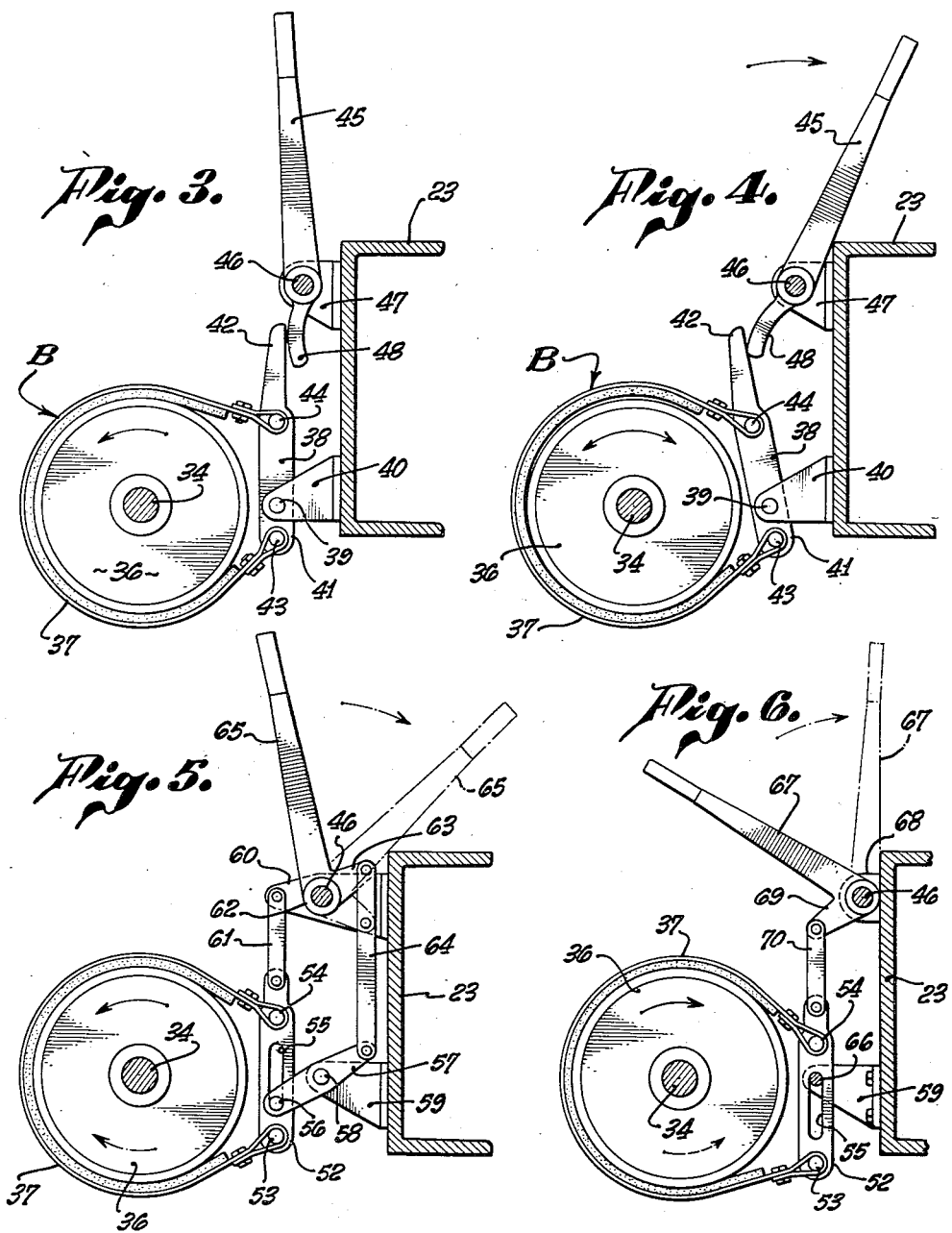

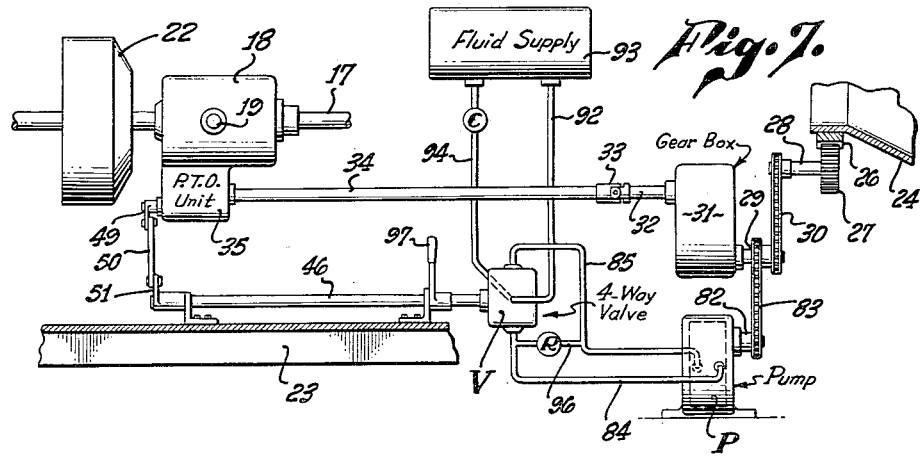

United States Patent Office 2,781,186
Patented Feb. 12, 1957

2,781,186

DRUM CONTROL MEANS FOR TRANSIT CONCRETE MIXERS

Henry C. Harbers, Pasadena, and Edward D. Sharpe, South Pasadena, Calif., assignors to Cook Bros. Equipment Co., Los Angeles, Calif., a corporation of California Application November 17, 1952, Serial No. 321,008

18 Claims. (Cl. 259—177)

This invention relates to transit concrete mixers, wherein a mixing drum is rotatably mounted on a motor vehicle truck, and by a power take-off mechanism driven through the selective gear transmission of the truck, can be driven in either direction. The mixing drum is interiorly provided with blades which, under rotation of the drum in one direction and during transit of the truck to a job, effect mixing of the concrete. Upon the truck reaching the job, the drum is adapted to be driven in the other direction causing the blades to discharge the mixed concrete from the drum.

Whenever the gear transmission is declutched and moved into neutral position incident to stopping forward travel of the truck, or when changing gears for different driving speeds, the force exerted by the weight of the concrete resting on the blades at the rising side of the drum, operates to rotate the drum in the reverse direction to which it was being driven at the time by the power take-off mechanism. This reversal in rotation of the drum is transmitted through the power take-off mechanism to the driving gears of the transmission, thus rotating such gears in the reverse direction to which they are normally rotated by the engine. As a consequence, when the transmission is again put into gear and the clutch released, sudden stresses are imposed on both the transmission and the power take-off mechanism, which frequently operates to strip or otherwise mutilate the gears as well as to impose damaging stresses on other parts of the whole driving mechanism. Moreover, the transmission gears cannot be engaged without clashing the possible stripping thereof, unless the driver waits until the drum comes to rest, which is impractical.

It is a purpose of this invention to provide in a transit concrete mixer a drum control means which operates automatically to prevent the aforedescribed reverse rotation of the mixing drum resultant of the force exerted by the weight of concrete on the blades at the rising side of the drum, and to thus prevent sudden imposition of detrimental stresses upon the gears of the transmission when forward movement is resumed, and also to eliminate the resultant difficulty in engaging the gears of the transmission.

Another purpose of this invention is to provide in such a control means, a brake which functions to allow the drum to be driven in that direction necessary to effect mixing of the concrete during transit of the truck, but prevents rotation of the drum in the opposite direction, and a mechanism which is manually operable to render the brake inactive so that when the truck reaches the job, the power take-off mechanism can operate to drive the drum in that direction necessary to discharge the concrete from the drum.

A further purpose of this invention is to provide in such a control means, a brake which is selectively operable to secure the drum against rotation reversely to its driving direction when the transmission is in neutral and declutched, so that not only can the drum be prevented, under the weight of the concrete on the blades at the rising side of the drum, from rotating reversely to the direction of rotation for and when mixing, but also from rotating reversely to the direction of rotation for and when discharging.

Another purpose of this invention is to provide, in conjunction with the conventional power take-off mechanism having a unit which is selectively operable to drive the drum in one direction or the other, of a connection between the control brake and the unit such that when the brake is moved to braking position to restrain the drum against rotation in one direction, the unit is simultaneously actuated to drive the drum in the other direction, and when the drum is moved to a non-braking position, the unit is simultaneously actuated to drive the drum in that direction in which it was formerly secured against rotation by the brake.

A still further purpose of this invention is the provision of hydraulic control means for the drum of a transit concrete mixer which is so correlated to the power take-off unit as to permit such unit to drive the drum in that direction for which the unit is set, but prevents rotation of the drum in the reverse direction under the force exerted by the weight of the concrete on the blades at the rising side of the drum.

Only four forms of drum control means, each embodying the invention, will be described herein and in association with one form of power take-off mechanism, and the novel features thereof will be pointed out in claims.

In the accompanying drawings:

Fig. 1 is a view showing in side elevation a truck concrete mixer with a part of the drum broken away and having a power take-off mechanism for driving the drum in which is incorporated one form of drum control means embodying the invention.

Fig. 2 is an enlarged top plan view showing schematically the power take-off mechanism in its association with the truck transmission, the drum, and the drum control means of Fig. 1.

Fig. 3 is an enlarged vertical sectional view taken on the line 3—3 of Fig. 2.

Fig. 4 is a view similar to Fig. 3 showing another position of the control means from that shown in Fig. 3.

Fig. 5 is a view similar to Fig. 3 showing another form of drum control means embodying the invention.

Fig. 6 is a view similar to Fig. 5 showing a third form of drum control means embodying the invention.

Fig. 7 is a view similar to Fig. 2, showing a hydraulic form of control means for the drum, and also embodying our invention.

Fig. 8 is a schematic view of the hydraulic control means of Fig. 7 with the control valve thereof in one position.

Fig. 9 is a view similar to Fig. 8, and showing the control valve in another position.

Having specific reference to the drawings, the truck mixer shown in Fig. 1 is conventional in that the rear wheels 15 are driven from the engine under the hood 16 through a shaft 17 and a transmission 18 of the gear type selectively operable by a lever 19. As best shown in Fig. 2, a drive shaft 20 extending from the forward end of the transmission, is adapted for operative connection to the engine shaft 21 through a conventional pedal operated clutch 22.

Supported on the rear of the truck frame 23 for rotation about an inclined axis, is a mixing drum 24 having an open upper rear end through which the drum is adapted to be charged with concrete aggregates. Fixed within the drum are spiral blades 25 operable under rotation of the drum in a clockwise direction as when viewed from the rear end of the drum, to lift and drop the aggregates to effect mixing thereof, and in a counter-clockwise direction to discharge the mixture from the rear end of the drum.

For driving the drum 24 in either direction a power take-off mechanism of conventional construction is provided. This mechanism is best shown in Fig. 2 as comprising a ring gear 26 encircling and fixed to the lower end of the drum 24 and constantly meshing with a pinion 27 fixed on a shaft 28. This shaft 28 is driven from a shaft 29 by a chain and sprocket connection 30, and the shaft 29, in turn, is driven by a reduction gearing contained in the box 31. Projecting from the box 31 is a shaft 32 connected by a universal joint 33 to a shaft 34 which is relatively long and connected to a power take-off unit 35.

This unit 35 is conventional in that it is selectively operable to effect forward and reverse drives of the remainder of the mechanism, the forward drive operating to rotate the drum 24 in a clockwise direction, as when viewed from the rear end thereof, and the reverse drive operating to rotate the drum in a counter-clockwise direction, as viewed from the same point. The unit 35 which has gears driven from the countershaft of the transmission 18, is therefore driven by the engine shaft 21 so long as the clutch 22 is engaged, and, hence, is driven irrespective of whether the transmission is in neutral or in gear.

Since the blades 25 are arranged spirally in the drum 24, whether the unit 35 is in a forward drive position for rotating the drum to mix the concrete therein, or in a reverse drive position for rotating the drum in a counter-clockwise direction to discharge the concrete therefrom, once the clutch 22 is disengaged and the transmission thrown into neutral incident to bringing the truck to a stop or when changing gear speeds, the force exerted by the weight of the concrete resting on the blades at the rising side of the drum immediately operates to rotate the drum in the opposite direction to which it was being driven. Such gears are driven at great speed and in a ratio of approximate 200 to 1 in respect to the drum gear 26.

As a consequence, when the clutch 22 is re-engaged the shaft 21 in reversing rotation of the gears of the unit 35 as well as the driving gears of the transmission, to turn with the shaft 21, imposes sudden stresses on such gears which frequently operate to strip or otherwise mutilate the gears. Additionally, the transmission gears cannot be re-engaged without clashing and possible stripping thereof, unless the driver waits until the drum comes to rest, which is impractical.

This reverse spinning of the drum and the objectionable results flowing therefrom can be eliminated by a control means which is operable to prevent such reverse rotation, and which this invention provides. One such control means is shown in Figs. 1 through 4, and this control means is automatically operable to prevent rotation of the drum in a direction reverse to the direction in which the drum is driven for mixing of the concrete during transit of the truck to a job.

This control means comprises a brake B which includes a drum 36 and a band 37. The drum 36 is fixed to the shaft 34 and the band 37 is supported in a position to extend around the drum by a lever 38 fulcrumed, as at 39, on a bracket 40 secured to one of the side beams of the truck frame 23. The position of the fulcrum 39 of the lever is such as to provide a short lever arm 41 and a long lever arm 42. One end of the band 37 is pivotally connected as at 43 to the free end of the lever arm 41, while the other end of the band is pivotally connected as at 44 to the long lever arm 42 and at a greater distance from the fulcrum 39 than is the connection 43. An operating lever 45 is fixed to a shaft 46 rotatable in brackets 47 fixed to the frame beam 23, and that portion of the lever below the shaft is shaped to provide a cam 48 which engages the upper end portion of the lever 38 to effect movement of the latter upon operation of the lever 45.

In the position of the lever 38 shown in Fig. 3, the band 37 is ineffective to prevent free rotation of the drum 36 in the direction of the arrow, but automatically grips and holds the drum against rotation in the other direction. This is because of the manner in which the band is connected to the lever 38 and the fact that the lever can swing in either direction. Since the connection of the upper end of the band with the lever is a greater distance from the lever fulcrum than is the connection of the lower end of the band, it follows that when the drum is rotated in a counter-clockwise direction it will pull the band in the same direction and thus move the long arm 42 toward the drum thereby causing the band to release the drum for free rotation in this direction. While the short arm 41 is simultaneously moved away from the drum its movement is ineffective to interfere with release of the drum.

Upon rotation of the brake drum 36 in a clockwise direction, as when viewed in Fig. 3, it functions to pull the band 37 in the same direction whereby, the short arm 41 of the lever 38 is moved toward the drum, and the long arm 42 away from the drum. Because of the shortness of the arm 41 movement of the band is instantly restrained causing it to immediately grip and secure the drum against further rotation. Thus it will be clear that according as the drum is rotated in a counter-clockwise or clockwise direction, the brake band is automatically operable to release or grip the drum.

It is when the drum 36 is rotating in a counter-clockwise direction that the shaft 34 is operating to drive the mixing drum clockwise to effect mixing of the concrete therein, and thus the brake does not interfere with this operation of the drum. However, during transit of the truck to a job, it becomes necessary from time to time to bring the truck to a stop, as at traffic signals, thus necessitating declutching of the transmission and shifting it into neutral. When this occurs the mixing drum is no longer driven, and hence is free to rotate. It is then that the weight of the concrete on the rising side of the drum immediately acts to rotate the drum in a reverse direction, thus causing the brake drum 36 to rotate in a clockwise direction as when viewed in Fig. 3. However, as aforedescribed, the brake band 37 of the control device becomes immediately operative to grip and secure the drum against such reverse rotation and, hence, prevents reverse driving of the gears of the unit 35 and the driving gears of the transmission by the drum. Thus the clutch may be re-engaged without imposing damaging stresses on such gears and permitting easy re-engagement of the transmission gears to resume forward travel of the truck.

When the truck reaches the job, and the concrete is to be poured from the mixing drum, the operator moves the lever 45 from the position shown in Fig. 3 to that shown in Fig. 4. By such lever movement the cam 48 acts to swing the lever 38 to the position shown in Fig. 4 causing the band 37 to be moved to a position such that the brake drum is released for rotation in either direction, and particularly in the direction necessary for the power take-off mechanism to rotate the mixing drum in that direction necessary to effect discharge of concrete from the drum.

As previously described, the power take-off unit 35 is selectively operable to drive the mixing drum 24 in either direction. For this purpose there is provided a crank arm 49 to which is connected a link 50. This link, in turn, is connected to a crank arm 51 fixed on the adjacent end of the shaft 46 so that according as the shaft is rotated in one direction or the other, the crank arm 49 will be operated to set the unit 35 for driving the mixing drum 24 in a clockwise direction for mixing or a counter-clockwise direction for discharging.

The operating lever 45 is so fixed to the shaft 46 that when it is in the position shown in Fig. 3 the unit 35 is set for forward or clockwise driving of the mixing drum, but as moved to the position shown in Fig. 4, the shaft 46 is rotated to set the unit for driving the mixing drum in a reverse or counter-clockwise direction. Thus it becomes evident that the drum control means is so interconnected with the unit 35 that operation of the brake band is controlled to check rotation of the mixing drum only in a counter-clockwise or discharging direction. This eliminates the possibility, otherwise, of the operator accidentally setting the brake band for operation to secure the brake drum against rotation in that direction in which it is driven, and which, if permitted, would result in destruction of the power take-off mechanism.

Referring now to Fig. 5, there is shown another form of drum control means which is selectively operable to cause the brake to automatically secure the shaft 34 against rotation in one direction or the other so as to not only prevent reverse rotation of the mixing drum following driving of the drum in a mixing direction, but also to prevent reverse rotation of the drum following driving thereof in a concrete discharging direction. In the latter case it will be understood that once the unit 35 is declutched from the engine shaft 21 and the transmission shifted into neutral, the force exerted by the weight of the concrete on the blades at the rising side of the drum will likewise rotate the drum in a direction opposite to the discharge direction, thereby presenting the same difficulty as to re-engagement of the gears when resuming forward travel of the truck, and the same damaging stresses on the transmission and power take-off mechanism.

The control means of Fig. 5 comprises the same brake drum 36 fixed to the same shaft 34, and the same brake band 37. Further, the lever 52 upon which the ends 53 and 54 are mounted, is provided with an adjustable fulcrum in order that the band may be automatically operable to grip and hold the drum against rotation in one direction or the other, and to allow free drum rotation in the opposite or driving direction of the drum by the mechanism.

This adjustable fulcrum comprises a slot 55 in the lever 52, and a pivot or fulcrum pin 56 in the slot and on one end of an arm 57 pivoted as at 58 on a bracket 59 fixed to the frame 23. The upper end of the lever 52 is suspended from an upper bracket 60 fixed to the frame 23 by means of a link 61. In this bracket 60 is journalled one end of the shaft 46, and fixed to the shaft is a hub 62 integral with an arm 63 connected to the other end of the arm 57 by a link 64. Also integral with the hub 62 is an operating arm 65.

In the position of this control means as shown, the arm 57 is in lowered position wherein the fulcrum pin 56 is at the lower end of the slot 55. As a result the band end 54 is positioned a greater distance from the fulcrum 56 than is the band end 53 so that under rotation of the drum 36 in a counter-clockwise direction, as indicated by the arrow, the band allows free rotation of the drum to permit the mixing drum to be driven in a clockwise or mixing direction. However, when the drum is rotated in the other direction, as a result of the mixing drum being reversely rotated under the weight of the concrete on the blades at the rising side of the mixing drum, the band is free to be moved by the brake drum to grip and hold the mixing drum against such reverse rotation.

Upon movement of the operating lever 65 to the broken line position shown, the arm 63 is lowered to move the link 64 downward and thus rock the arm 57 to move the fulcrum pin 56 to the upper end of the slot 55. With the fulcrum pin in this position, the band end 53 is a greater distance from the pin 56 than is the band end 54. As a consequence, the band 37 now becomes operative to grip the drum only when the latter attempts to rotate it in a counter-clockwise direction, but releasing it when the drum is rotated in the opposite direction.

Manifestly, the brake now operates just the reverse to that previously described so as to prevent rotation of the mixing drum in the other direction resultant of the force exerted by the concrete on the rising side of the blades, and yet permitting driving of the drum in the direction for discharging concrete therefrom. This form of control means is of particular advantage when pouring concrete to form curbings or gutters since in so doing frequent starting and stopping of the truck is necessary.

Since the operating lever 65 is fixed to the shaft 46 it follows that the unit 35 is simultaneously shifted to forward or reverse according as the lever is moved to the solid position or the broken line position and, consequently, it becomes impossible for a brake application to be effected such as to hold the drum against rotation in a counter-clockwise direction when the unit is in a forward drive position, and in a clockwise direction when the unit is in a reverse drive position.

In Fig. 6 is shown a third form of drum control means which, although structurally simplified as compared to the means shown in Fig. 5, operates in the same manner and therefore provides the same advantages. In this form of the invention, the same slotted lever 52 is employed, but the fulcrum pin 66 therefor is fixed on the lower bracket 59. An operating lever 67 is fixed on the shaft 46 as journalled in an upper bracket 68 secured to the frame 23. The hub of the lever 67 is provided with a crank arm 69 connected to the upper end of the lever 52 by a link 70.

In operation, when the lever 52 is in the lowered position shown, the band end 54 is disposed a distance from the fulcrum pin 66 less than the band end 53, and thus the band 37 can be operated by the drum 36 to grip and hold the latter against counter-clockwise rotation by the mixing drum 24 under the force exerted by the weight of concrete on the blades at the rising side of the mixing drum. As will be understood, the band 37 is ineffective to grip the drum when the latter is rotated in a clockwise direction.

By lifting the lever 67 to the broken line position, the lever 52 is elevated so that the fulcrum 66 is now in the lower end of the slot 55. In this position of the lever 52, the spacing of the band ends 53 and 54 in relation to the fulcrum 66 is reversed so that the band 37 is now set to grip and hold the drum 36 against rotation clockwise by the mixing drum 24 under the force exerted by the weight of concrete on the blades at the rising side of the mixing drum. Since the operating lever 67 is fixed to the shaft 46, the unit 35 is simultaneously shifted to forward or reverse position through operation of the lever in the same manner and to provide the same advantage as described in connection with the other drum control means.

In Figs. 7, 8 and 9 is shown a hydraulic control means for the mixing drum of a transit type concrete mixer as distinguished from the mechanical control means previously described herein. This hydraulic control means, in the present instance, comprises a rotary pump P having a pair of intermeshing gears 81 in a casing 80, one of which is driven by a shaft 82 operatively connected by a chain and sprocket connection 83 to the shaft 29 where it extends from the gear box 31.

Leading from opposite sides of the casing 80 are conduits 84 and 85 which connect the interior of the casing to ports 86 and 87 in a housing 88 of a four-way control valve V having arcuate port 89 and 90 therein. A third port 91 is formed in the housing 88 which communicates with one end of a conduit 92, the other end of the conduit communicating with the bottom of a fluid supply tank 93.

A fourth conduit 94 leads from the bottom of the tank 93 to a fourth valve port 95, and in such conduit is a check valve C which allows fluid to pass downwardly to the valve from the tank but not upwardly to the tank.

A fifth conduit 96 bridges the conduits 84 and 85, and in this conduit is a conventional relief valve R the purpose of which is manifest.

As best shown in Fig. 7 the valve V is fixed to the rear end of the shaft 46, displacing the brake B in Fig. 2, and an operating lever 97 is fixed to the shaft 46 for turning it in either direction and thereby simultaneously turning the valve V to occupy the position shown in Fig. 8 or that shown in Fig. 9.

In operation, when the lever 97 is turned to the position shown in Fig. 8 to set the power take-off unit 35 for forward drive of the drum 24 to agitate the concrete during transit of the truck to a job, the valve V occupies the position shown in Fig. 8 in which the port 89 places the ports 86 and 95 in communication with each other, while the port 90 connects the ports 91 and 87. This allows fluid in the system to be freely circulated by the pump as driven from the shaft 29, in the manner indicated by the arrows in Fig. 8, and thus the pump does not interfere with driving of the drum.

Such free fluid circulation continues so long as the unit 25 is driven from the transmission 18, but when the transmission is declutched and placed in neutral permitting the drum 24 to be rotated in a reverse direction under the force exerted by the weight of the concrete on the blades at the rising side of the drum, such reverse rotation is checked by the pump P. It will be understood that the drum in attempting to rotate reversely tends through the intervening mechanism to reversely rotate the pump gears 81, but cannot so do because the check valve C prevents reverse circulation of the fluid in the system.

When the lever 97 is moved to the position shown in Fig. 9, for setting the unit 35 to drive the drum 24 in a reverse direction for discharging concrete therefrom at the job, the valve V is turned to the position shown in Fig. 9, thus causing the port 89 to connect the ports 86 and 91, and the port 90 to the ports 87 and 95. Thus the pump P as now driven from the shaft 29 can circulate fluid freely through the system in the manner indicated by the arrows in Fig. 9.

However, when there is any cessation in driving of the drum 24 in a discharging direction, which occurs when the transmission is declutched and shifted into neutral, the drum tends to rotate in the other direction under the force exerted by the weight of concrete on the blades at the rising side of the drum. It is then that the drum tends to drive the pump P in the opposite direction to which it was driven. This, however, cannot occur because the fluid in the system secures the pump against such reverse rotation under the action of the check valve C.

From the foregoing operation of the hydraulic control means, it is manifest that the valve V is operable simultaneously with shifting of the unit 35 to effect forward or reverse driving of the drum, to so control fluid circulation in the system as to utilize the pump in preventing rotation of the drum in a reverse direction under the force exerted by the weight of the concrete on either rising side of the drum, from that direction in which it was previously driven.

Although only four forms of drum control means, each embodying the invention, have been described herein, it is to be understood that various changes and modifications may be made therein without departing from the spirit of the invention or the spirit and scope of the appended claims.

What we claim is:

1. In a truck mixer having an engine driven shaft, a selective gear transmission, and a clutch for connecting said transmission to said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; and means associated with said mechanism movable to occupy a first position in which, when said drum is drivingly disconnected from said shaft following driving of said drum in one direction, it operates to prevent reverse rotation of said drum resultant of the weight of concrete on the blades at the rising side of the drum, and a second position in which, when said drum is drivingly disconnected from said shaft following driving of said drum in the other direction, it operates to prevent reverse rotation of said drum resultant of the weight of concrete on the blades at the rising side of the drum.

2. In a truck mixer having an engine driven shaft, a selective gear transmission, and a clutch for connecting said transmission and said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; means associated with said mechanism movable to occupy a first position in which, when said drum is drivingly disconnected from said shaft following driving of said drum in one direction, it operates to prevent reverse rotation of said drum resultant of the weight of concrete on the blades at the rising side of the drum, and a second position in which, when said drum is drivingly disconnected from said shaft following driving of said drum in the other direction, it operates to prevent the reverse rotation of said drum resultant of the weight of the concrete on the blades at the rising side of the drum; and mechanism manually operable to move said means to any one of said positions.

3. In a truck mixer having an engine driven shaft, a selective gear transmission, and a clutch for connecting said transmission to said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; means associated with said mechanism movable to occupy the first position in which, when said drum is drivingly disconnected from said shaft following driving of said drum in one direction, it operates to prevent reverse rotation of said drum resultant of the weight of concrete on the blades at the rising side of the drum, and a second position in which, when said drum is drivingly disconnected from said shaft following driving of said drum in the other direction, it operates to prevent the reverse rotation of said drum resultant of the weight of concrete on the blades at the rising side of the drum; mechanism manually operable to move said means to any one of said positions; and elements so interconnecting said unit and said mechanism that when said means is moved to the first position, said unit will be actuated to cause said drum to be driven in said one direction, and when said means is moved to the second position, said unit will be caused to drive said drum in said other direction.

4. In a truck mixer having an engine driven shaft a selective gear transmission, and a clutch for connecting said transmission to said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; a brake drum fixed to said mechanism; a brake band;

and a lever mounting said band, said lever so constructed and arranged in relation to said brake drum so that when the latter is driven in one direction it will operate to move said band free of said brake drum, and when the brake drum is rotated in the other direction under the weight of concrete on the rising side of the blades of the mixing drum, said band will be actuated by the brake drum to effect braking engagement of the latter.

5. In a truck mixer having an engine driven shaft, a selective gear transmission, and a clutch for connecting said transmission to said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; a brake drum fixed to said mechanism; a brake band; a lever for mounting said band in relation to said brake drum so that when the latter is driven in one direction it will operate to move said band free of said brake drum, and when the brake drum is rotated in the other direction under the weight of concrete on the rising side of the blades of the mixing drum, said band will be actuated by the brake drum to effect braking engagement of the latter; and an operating lever for moving the first-mentioned lever to a position in which said band is ineffective to prevent rotation of the brake drum in that direction in which the same is driven by said mechanism.

6. In a truck mixer having an engine driven shaft, a selective gear transmission, and a clutch for connecting said transmission to said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; a brake drum associated with said mechanism to be driven in either direction thereby; a brake band; a lever supporting said band about said brake drum; and means so supporting the lever that its fulcrum is movable to occupy one position in which the brake band is operable by the brake drum to secure the latter against rotation in one direction, and another position in which the brake band is operable by the brake drum to secure the latter against rotation in the other direction.

7. Means for controlling rotation of the mixing drum of a transit mixer, including: a brake drum; a brake band; a lever to which the ends of said band are connected at different distances from and on opposite sides of the fulcrum of the lever; means for mounting the lever so that the fulcrum thereof is shiftable lengthwise of the lever in one direction or the other; and manually operable means for shifting the lever fulcrum.

8. Means for preventing reverse rotation of the mixing drum of a transit concrete mixer due to the force of the weight of concrete on the rising side of the blades of the mixer when it is disconnected from its driving means, including: a brake drum; a brake band about the latter; a lever fulcrumed to provide one arm to which one end of said band is connected, and another arm to which the other band end is connected at a point closer to the lever fulcrum than the other band end; and a second lever normally operable to move the first-mentioned lever on its fulcrum.

9. Means for preventing reverse rotation of the mixing drum of a transit concrete mixer due to the force of the weight of concrete on the rising side of the blades of the mixer when it is disconnected from its driving means, including: a brake drum; a brake band about the latter; a lever having a slot lengthwise therein, one end of said band connected to the lever beyond one end of the slot, and the other band end connected to the lever beyond the other end of the slot; a fulcrum for the lever mounted for lengthwise movement in the slot; and manually operable means for moving the fulcrum.

10. Means for preventing reverse rotation of the mixing drum of a transit concrete mixer due to the force of the weight of concrete on the rising side of the blades of the mixer when it is disconnected from its driving means, including: a brake drum; a brake band about the latter; a lever having a slot lengthwise therein, one end of said band connected to the lever beyond one end of the slot, and the other band end connected to the lever beyond the other end of the slot; a stationary fulcrum for the lever disposed in the slot; and manually operable means for moving the lever lengthwise to position said fulcrum at one end or the other of the slot.

11. Means for preventing reverse rotation of the mixing drum of a transit concrete mixer due to the force of the weight of concrete on the rising side of the blades of the mixer when it is disconnected from its driving means, including: a brake drum; a brake band about the latter; a lever having a slot lengthwise therein, one end of said band connected to the lever beyond one end of the slot, and the other band end connected to the lever beyond the other end of the slot; a link for suspending the upper end of the lever from a support; a pivoted arm having a pin in the slot; an operating lever; and a link connecting the operating lever to said arm so that according as the operating lever is moved in one direction or the other, said arm will be actuated to move the pin to one end of the slot or the other.

12. Means for preventing reverse rotation of the mixing drum of a transit concrete mixer due to the force of the weight of concrete on the rising side of the blades of the mixer when it is disconnected from its driving means, including: a brake drum; a brake band about the latter; a lever having a slot lengthwise therein, one end of said band connected to the lever beyond one end of the slot, and the other band end connected to the lever beyond the other end of the slot; a stationary fulcrum for the lever disposed in the slot; a link connected to the upper end of the lever; a crank arm connected to the link; and an operating lever for actuating the crank arm and link to elevate or lower the lever so as to position said fulcrum at one end of the slot or the other.

13. In a truck mixer having an engine driven shaft, a selective gear transmission, and a clutch for connecting said transmission and said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; a hydraulic circuit including a source of fluid supply, a pump for circulating fluid in said circuit, a valve for directing circulation of fluid in said circuit through the pump in one direction or the other; means to connect the pump to said unit so that it is driven thereby in one direction or the other; and a check valve in said circuit operating to prevent circulation of fluid through the pump in a direction opposite to the direction in which it was circulated by the pump at the time said transmission was disconnected from said shaft thus causing the fluid to prevent driving of the pump by the drum through that force exerted on the blades at the rising side of said drum and thereby holding the drum against movement by said force.

14. In a truck mixer having an engine driven shaft, a selective gear transmission, and a clutch for connecting said transmission and said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; a hydraulic circuit having a pump and a source of fluid therein; means connecting the pump to said unit so as to be driven in one direction or the other; valved means in said circuit movable to either of two positions allowing fluid to be circulated by said pump in one direction or the other through said pump according as said means occupies one position or the other; and a check valve in said circuit operating to allow fluid to be circulated by and when said pump is driven in either direction by said unit, but preventing fluid being circulated by the pump when the latter is driven by reverse rotation of said drum resultant of the force exerted by the weight of concrete on the rising side of the drum, as occurs when said transmission is disconnected from said shaft, thereby causing the fluid to prevent driving of the pump by the drum, to hold the drum against reverse rotation.

15. In a truck mixer having an engine driven shaft, a selective gear transmission, and a clutch for connecting said transmission and said shaft; a rotary mixing drum having internal blades operable to mix concrete in the drum or discharge the concrete therefrom according as the drum is rotated in one direction or the other; driving mechanism for said drum having a power take-off unit driven by said transmission and operable to selectively drive said drum in one direction or the other; and hydraulic means associated with said mechanism and operating to allow said drum to be driven in either direction by said unit, but when said transmission is disconnected from said shaft, prevents rotation of said drum resultant of the force exerted by the weight of concrete on the rising side of the drum.

16. In a truck mixer as embodied in claim 14, wherein means is provided connecting said unit to said valved means so that according as said unit is operated to drive said drum in one direction or the other, said valved means will be moved to one position or the other.

17. In a truck mixer having a rotary mixing drum driven by a shaft from the engine, a clutch-controlled selective gear transmission connected to said shaft and a driving mechanism including a power take-off unit driven by said transmission to drive the drum selectively in one direction or the other, said drum having internal blades operable in one direction to mix concrete and in the other direction to discharge concrete according as the drum is rotated in one or the other direction, control means connected to said driving mechanism adjustable to drive said drum selectively in either direction, said control means including brake means which prevents rotation of said drum as a result of the force exerted by the weight of the concrete on the rising side of the drum, when said transmission is disconnected from said shaft and which is disengaged from said shaft to permit the drum to be drivingly rotated in either direction when the transmission is connected to said shaft, and means whereby the transmission may be entirely disconnected from the drum to permit the automatic application of said braking means.

18. In a truck mixer having a rotary mixing drum driven by a shaft from the engine, a clutch-controlled selective gear transmission connected to said shaft, and a driving mechanism including a power take-off unit driven by said transmission to drive the drum selectively in one direction or the other, said drum having internal blades operable in one direction to mix concrete and in the other direction to discharge concrete according as the drum is rotated in one or the other direction, manually operable means adjustable to control operation of said unit so as to drive said drum selectively in either direction, and brake means for said drum so controllable by said manually operable means that according as said drum is driven by said unit in one direction said brake means is automatically set to prevent reverse rotation of said drum as a result of the force exerted by the weight of the concrete on the rising side of said drum, following declutching of said transmission.

References Cited in the file of this patent

UNITED STATES PATENTS

| | | |
|---|---|---|
| 1,615,315 | Shaw | Jan. 25, 1927 |
| 1,781,965 | Ball | Nov. 18, 1930 |
| 1,867,838 | Jaeger | July 19, 1932 |
| 1,885,350 | Hoffmann | Nov. 1, 1932 |
| 2,243,035 | Hilkemeier | May 20, 1941 |

OTHER REFERENCES

Ser. No. 262,677, Pagliano (A. P. C.), published May 18, 1943.